(12) United States Patent
Liu et al.

(10) Patent No.: US 9,322,284 B2
(45) Date of Patent: Apr. 26, 2016

(54) MECHANISM FOR SYNCHRONOUSLY VARYING PITCH OF A MULTI-BLADE ROTOR

(76) Inventors: Jin Peng Liu, Shanghai (CN); Wei Yuan, Zibo (CN); Shao Jun Zhou, Shanghai (CN)

(\*) Notice: Subject to any disclaimer, the term of this patent is extended or adjusted under 35 U.S.C. 154(b) by 914 days.

(21) Appl. No.: 13/520,733

(22) PCT Filed: Sep. 2, 2011

(86) PCT No.: PCT/CN2011/079295
§ 371 (c)(1),
(2), (4) Date: Jul. 5, 2012

(87) PCT Pub. No.: WO2013/029277
PCT Pub. Date: Mar. 7, 2013

(65) Prior Publication Data
US 2013/0216380 A1 Aug. 22, 2013

(51) Int. Cl.
*F03D 7/02* (2006.01)
*F01D 7/00* (2006.01)
(52) U.S. Cl.
CPC ............... *F01D 7/00* (2013.01); *F03D 7/0224* (2013.01); *F05B 2260/76* (2013.01); *F05B 2260/79* (2013.01); *Y02E 10/723* (2013.01)
(58) Field of Classification Search
CPC .............................. F03D 1/658; F03D 7/0224
USPC .................................................. 416/147, 205
See application file for complete search history.

(56) References Cited

U.S. PATENT DOCUMENTS

| 4,183,715 A | 1/1980 | Ducker |
| 4,435,646 A | 3/1984 | Coleman et al. |

(Continued)

FOREIGN PATENT DOCUMENTS

| CN | 101037988 A | 9/2007 |
| CN | 201334986 Y | 10/2009 |

(Continued)

OTHER PUBLICATIONS

International Search Report in WO2013/029277A1.

*Primary Examiner* — Sean J Younger
(74) *Attorney, Agent, or Firm* — Meagher Emanuel Laks Goldberg & Liao, LLP (57) ABSTRACT

A mechanism for synchronously varying pitch of a multi-blade rotor, such as rotors used in wind or hydraulic generator and helicopter is provided in the present invention. The sync-pitch-varying mechanism for the rotor mainly comprises a bearing a driver, a transmission, a linkage and a control unit, wherein the transmission includes a shaft coupling, a ballscrew, an intermediate cylinder, a driven shaft and a transition cylinder; the linkage includes a link hub, a guide support and multiple links; the control unit includes a speed sensor, a position sensor, a switch and a programmable controller; a rotatory driving force output by said driver through the shaft coupling is transmitted to the driven shaft through a screw-and-nut transmission between the ballscrew and the intermediate cylinder of the transmission so as to drive the driven shaft to move in a linear motion which is then transferred from the driven shaft to the link hub of the linkage through means of the transition cylinder; the controller is configured to enable the driven shaft to move reciprocally within a predefined range of length in order to move the link hub back and forth along the guide support in an axial direction thereof, and therefore multiple bearings for supporting the blades of the rotor are rotatably movable through the multiple links of the link hub. Advantageously, the mechanism of the invention has a simple and compact structure, low cost and high reliability, and the operation is easy to be controlled precisely.

7 Claims, 12 Drawing Sheets

(56) References Cited

U.S. PATENT DOCUMENTS

| | | | |
|---|---|---|---|
| 4,490,093 A | | 12/1984 | Chertok et al. |
| 4,623,051 A | * | 11/1986 | Lochmoeller ............... 192/223.4 |
| 6,240,797 B1 | * | 6/2001 | Morishima et al. .......... 74/89.39 |
| 8,003,582 B2 | * | 8/2011 | Mikami ........................ 508/165 |
| 2011/0135471 A1 | | 6/2011 | Wangford |

FOREIGN PATENT DOCUMENTS

| | | | | | |
|---|---|---|---|---|---|
| CN | 201881049 U | * | 6/2011 | | |
| CN | 201953567 U | | 8/2011 | | |
| JP | 2000061984 A | * | 2/2000 | ............... | B29C 45/20 |
| JP | 2001120599 A | * | 5/2001 | ............... | A61G 3/00 |
| WO | 2013/029277 A1 | | 3/2013 | | |

* cited by examiner

MECHANISM FOR SYNCHRONOUSLY VARYING PITCH OF A MULTI-BLADE ROTOR

FIELD OF THE INVENTION

The present invention relates to a pitch-variable rotor being applied in wind generators or hydraulic generators, and more particularly relates to a mechanism for synchronously varying pitch of a multi-blade rotor.

BACKGROUND OF THE INVENTION

Along with the rapid growing of economics, energy demand in the industry and our daily life is increasing continuously, while on the other hand the environment protection is facing a tremendous challenge. Since the wind power and hydraulic power are renewable clean power, wind generators and hydraulic generators are more and more applied over the world.

Rotor blades as key elements for driving rotors of wind or hydraulic generators are very important in that their profile and shape are rather decisive to the efficiency of the power generation. For the sake of sufficiently using the energy and increasing the rate of the power transformation, rotors with pitch-variable technology are now the first preference in the market.

Presently, one most commonly used conventional type of pitch-variable rotor is to provide each blade with a separate set of pitch varying mechanism, which is synchronously controlled by one controller. Those types of conventional pitch varying mechanisms usually include a servo motor connected with a gearing transmission, and a direct-driven electric cylinder, etc. However, there are still some deficiencies in the conventional pitch varying mechanisms of the rotors as follows.

Most of those conventional pitch varying mechanisms are designed in a complicated structure with a large size, and therefore not only costly but also not suitable to be installed in small-medium sized generators;

The energy consumption is big due to their multiple driving manner;

The operation reliability is low because a rotary joint must be used for cable connection in all kinds of control circuits in the conventional pitch varying mechanism, and therefore it is difficult to ensure the precision of detection in order to control the operation;

The weight and inertia of the rotor of the generator are both increased because many mechanical parts are accommodated inside of the rotor hub, therefore the rate of failure of the blade varying is increased, and the efficiency of the power generation is reduced;

When a system failure occurs, it is difficult to inspect and repair in a short time in those conventional types of pitch varying mechanism;

An external power supply is indispensable for those conventional pitch varying mechanisms to perform protective blade reinstatement in case of system halt, therefore there is still a risk when this external power supply is failed.

Therefore, it is really desirable to develop a new type of mechanism for synchronously varying pitch of a multi-blade rotor into a simple and compact structure which is easy to be controlled, and with high precision and high operation reliability, but low cost and low energy consumption.

SUMMARY OF THE INVENTION

The object of the present invention is to provide a new mechanism for synchronously varying pitch of a multi-blade rotor for the purpose of removing all the above mentioned deficiencies and problems of the prior arts. Said mechanism of the present invention employs a single driver to drive a transmission and a linkage in order to perform a sync-pitch-varying of the multiple blades of the rotor. Said single driver sync-pitch-varying mechanism is configured to be suitable in various small-medium-sized multi-blade rotors.

In order to achieve the above object, the present invention provides a new single driver sync-pitch-varying mechanism for a multi-blade rotor having a rotor hub with multiple blades, wherein said multiple blades are equal-spaced mounted around said rotor hub through means of corresponding bearing seats, each one of which includes a bearing having an outer ring and an inner ring being rotatably movable with respect to said outer ring. Said mechanism includes a driver, a transmission, a linkage and a control unit, wherein said transmission includes a shaft coupling, a ballscrew, an intermediate cylinder, a driven shaft and a transition cylinder; said linkage includes a link hub, a guide support and multiple links; said control unit includes a speed sensor, a position sensor, a switch and a programmable controller, wherein a rotatory driving force output by said driver through the shaft coupling is transmitted to the driven shaft through a screw-and-nut transmission between the ballscrew and the intermediate cylinder of said transmission so as to drive the driven shaft to move in a linear motion which is then transferred from the driven shaft to the link hub of the linkage through means of the transition cylinder; said controller is configured to enable the driven shaft to move reciprocally within a pre-defined range of length in order to move the link hub back and forth along the guide support in an axial direction thereof, and therefore said multiple inner rings are rotatably movable in same angle speed synchronously with respect to said corresponding multiple outer rings of said multiple bearing under the driving of the link hub through the corresponding multiple links.

The single driver sync-pitch-varying mechanism for a multi-blade rotor according to the present invention is capable of simultaneously control pitch varying of multiple blades of a rotor through the means of the transmission and the multiple links of the linkage corresponding to the multiple bearing seats of the multiple blades, thereby driving the link hub of the linkage to move linearly by the single driver so as to simultaneously control pitch varying of the multiple blades of the rotor. Advantageously, the structure of the sync-pitch-varying mechanism of the present invention is simple and compact, and the control of the sync-pitch-varying mechanism for the multi-blade rotor is precise, consistency and high reliability.

The above and other objects and features of the invention will be now described in detail according to the embodiments, and the concept and thought of the technical features and effectiveness of the present invention will become apparent from the following detailed description considered in conjunction with the accompanying drawings.

DETAILED DESCRIPTION OF EMBODIMENTS

Now the present invention will be described in detail in conjunction with embodiments as illustrated in the accompanying drawings. Since the pitch varying technology is applicable in various rotors, such as rotors of wind or water turbine and helicopter etc., the present invention first relates to a mechanism for synchronously varying pitch of a rotor applicable in various technology domains. It is understandable that the following description of an embodiment of a single driver sync-pitch-varying mechanism is only one practical application of the present invention as for exemplary illustrating the mechanism and the principle of the invention, but not for limitation of the protection scope of the invention.

Figure 1:
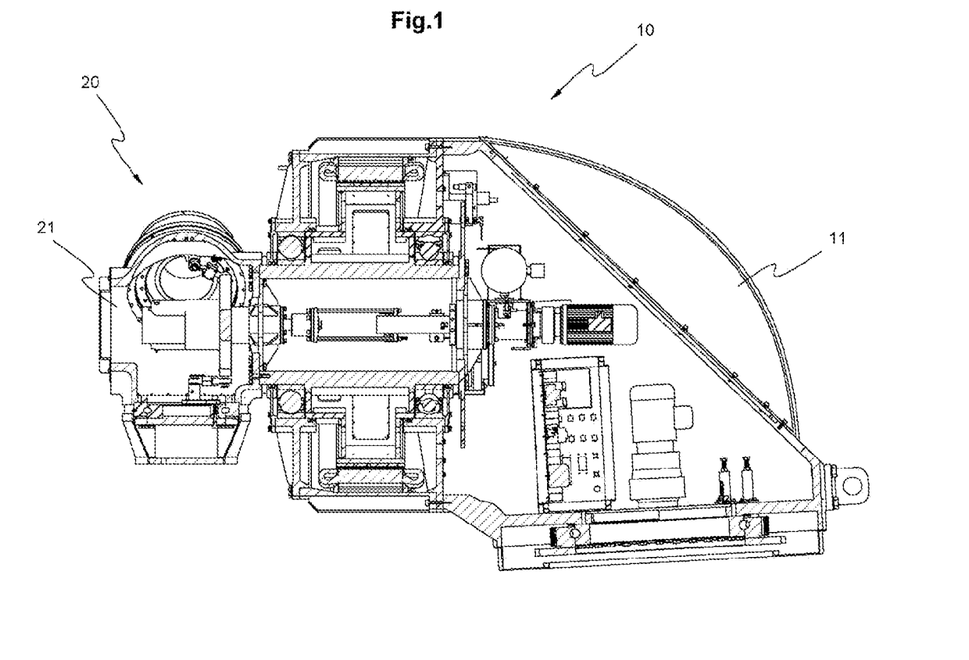
FIG. 1 is a cross sectional view of a wind turbine including a generator and a rotor provided with a sync-pitch-varying mechanism according to the present invention.
Figure 2A:
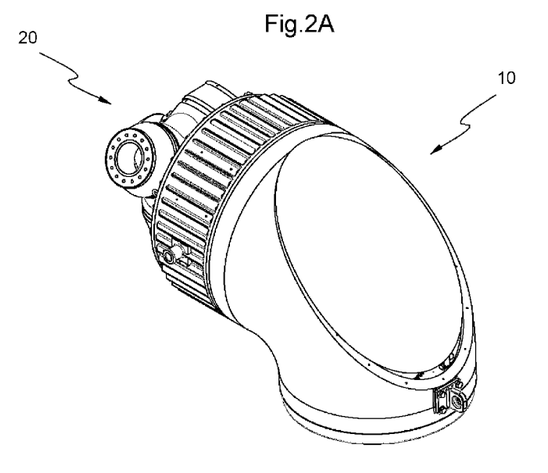
FIG. 2A is a perspective view of the wind turbine as shown in FIG. 1.
Figure 2B:
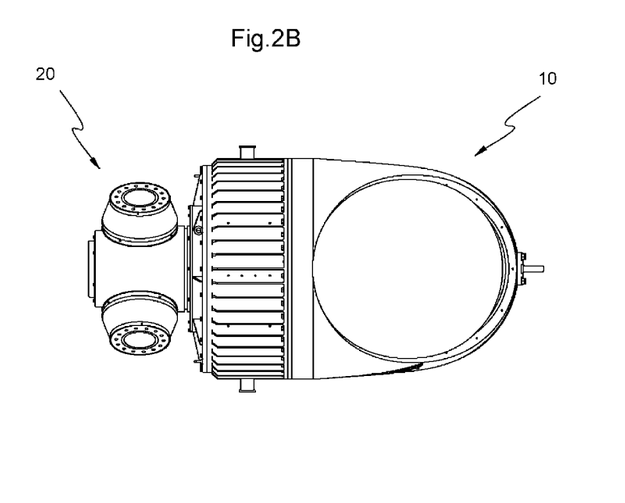
FIG. 2B is a top view of the wind turbine as shown in FIG. 1.

FIG. 1 is cross sectional view illustrating a general structure of a wind turbine having a generator and a rotor with a single driver sync-pitch-varying mechanism installed therein in accordance with the present invention. A typical wind turbine normally comprises two parts, a generator 10 arranged in a nacelle 11 and a rotor 20, which includes a rotor hub 21 and multiple blades (not shown in the figure) equal-spaced mounted around the rotor hub 21. The single driver sync-pitch-varying mechanism for synchronously varying pitch of this type of multi-blade rotor 20 in accordance with the present invention is accommodated in the rotor hub 21 and the nacelle 11 of the wind turbine 10. FIG. 2A and 2B are perspective view and top view of the wind turbine as shown in FIG. 1.

Figure 3:
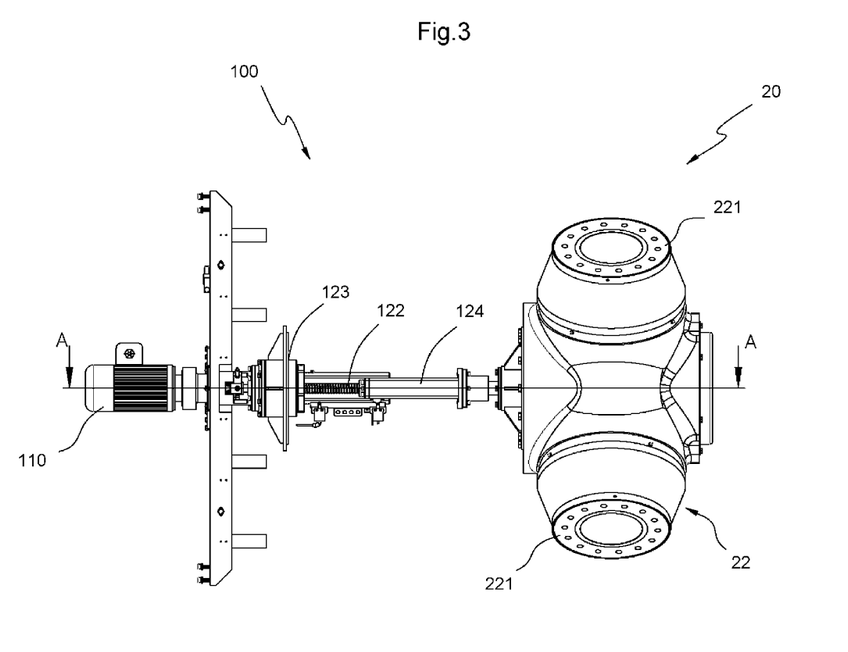
FIG. 3 is a top view showing the sync-pitch-varying mechanism installed in the wind turbine with a main part of the generator omitted.
Figure 4:
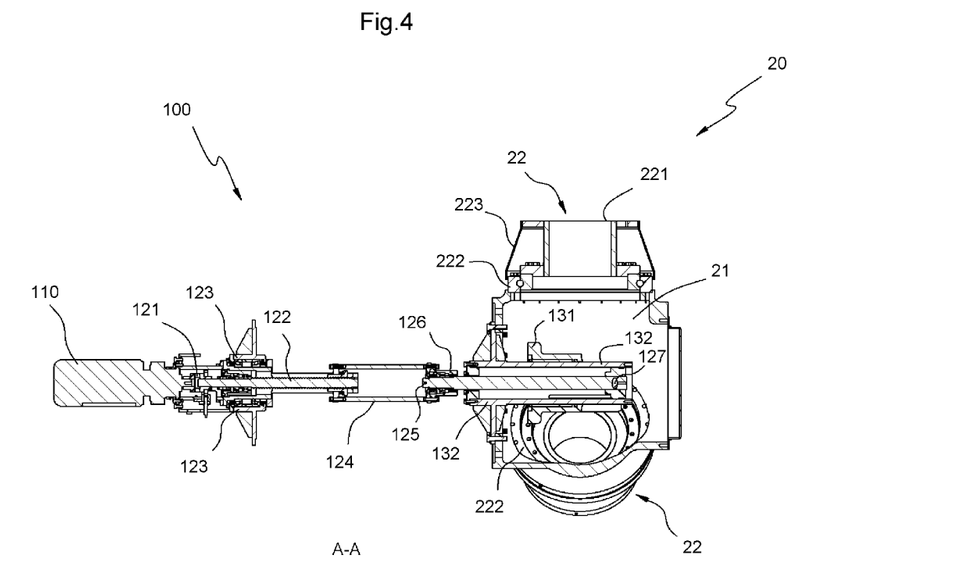
FIG. 4 is a cross sectional view along line A-A in FIG. 3 showing the sync-pitch-varying mechanism in accordance with the present invention.
Figure 5:
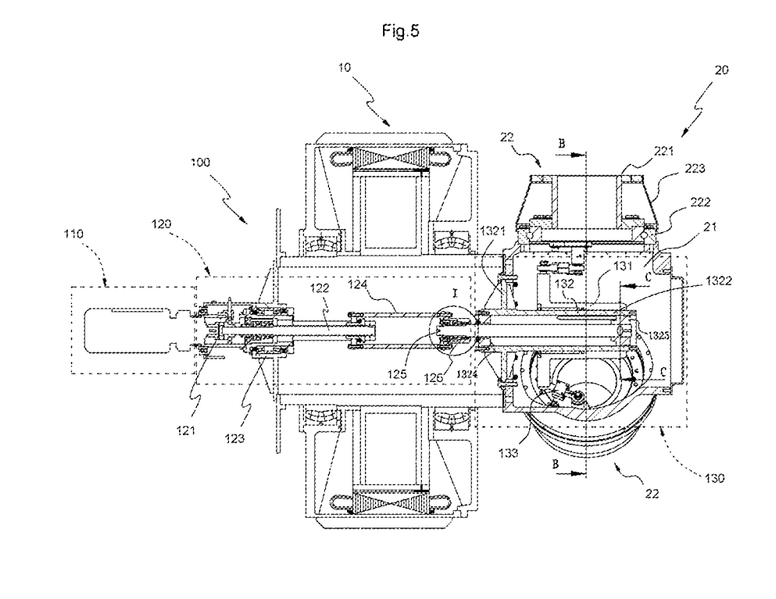
FIG. 5 is an enlarged schematic cross-sectional view showing the sync-pitch-varying mechanism installed in the wind turbine in accordance with the present invention.

FIG. 3 is a plan view showing a single driver sync-pitch-varying mechanism 100 of present invention from the top with the generator 10 shown in FIG. 1 omitted herein in order to exhibit its structure clearly. FIG. 4 is a cross-sectional view along a line A-A in FIG. 3 illustrating the single driver sync-pitch-varying mechanism of present invention. Further, FIG. 5 is an enlarged cross-sectional view illustrating the situation in more detail when the single driver sync-pitch-varying mechanism 100 of present invention is installed in the wind turbine, wherein a first part of the wind turbine indicated in dotted line in the drawing represents the generator 10 of the wind turbine, which includes a generator rotor 12 and a generator stator 13, and a second part of the wind turbine indicated in solid line includes a rotor hub 21 of the rotor 20 and the single driver sync-pitch-varying mechanism 100 accommodated in the rotor hub 21 and the nacelle 11 of the wind turbine 10. The rotor hub 21 has multiple fixing openings equal-spaced defined there around, each fixing opening is fixed with a bearing seat 22 for corresponding blade to be installed thereto.

Figure 6:
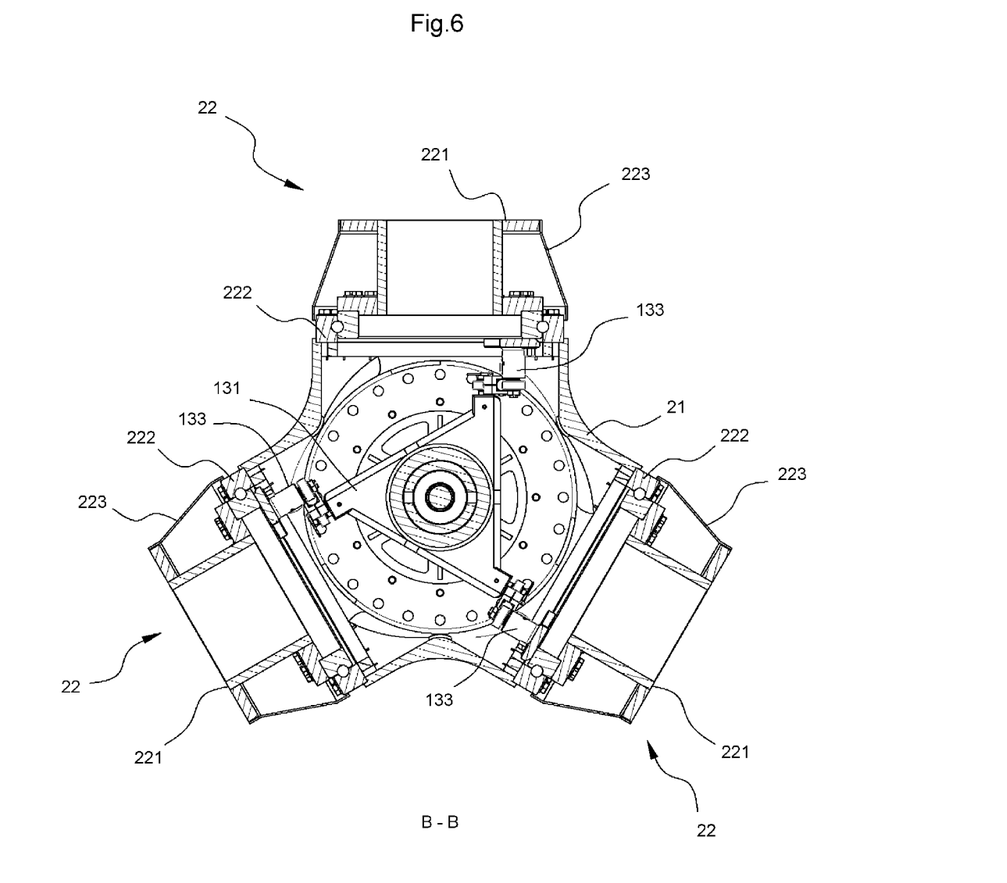
FIG. 6 is a cross sectional view along line B-B in FIG. 5 showing the sync-pitch-varying mechanism in accordance with the present invention.
Figure 7:
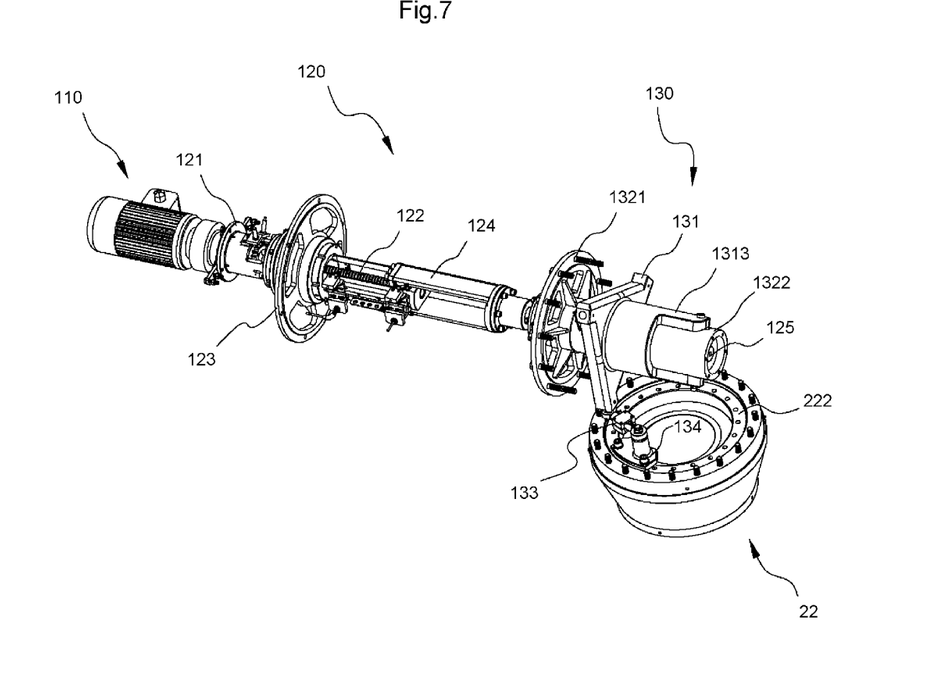
FIG. 7 is a schematic perspective view of the sync-pitch-varying mechanism in accordance with the present invention, showing only one bearing seat.
Figure 8:
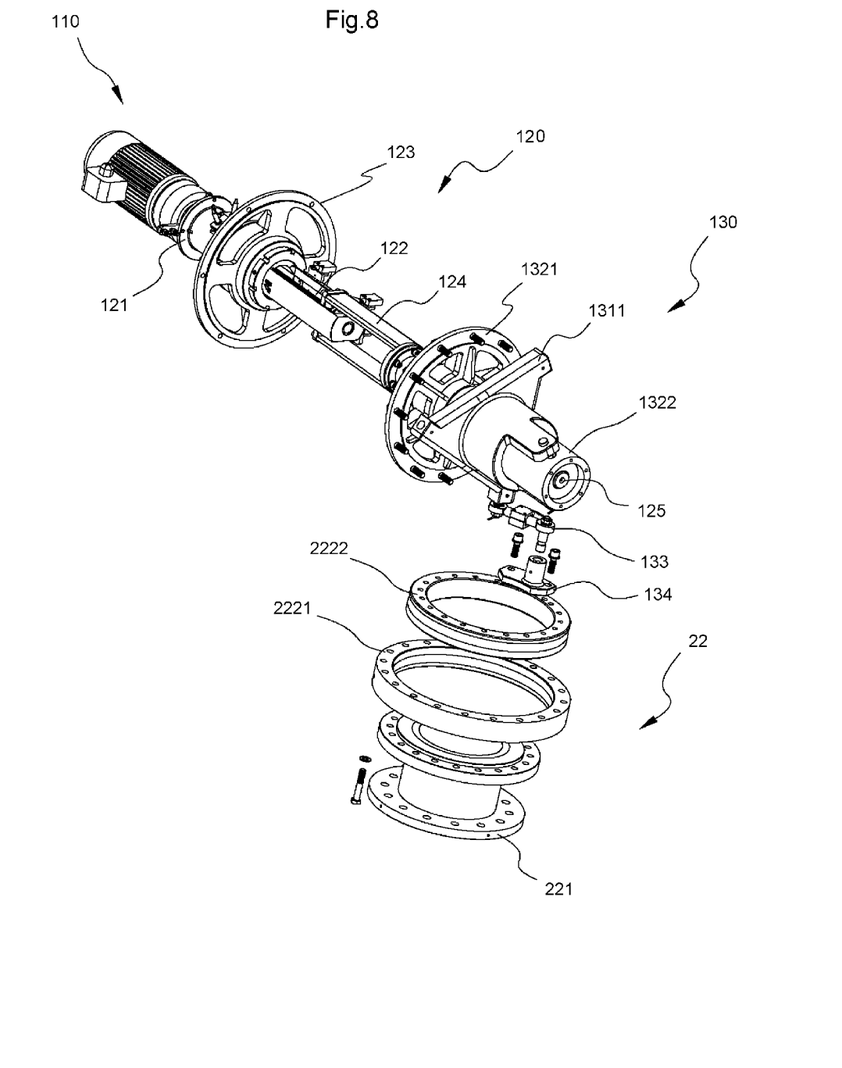
FIG. 8 is a schematic perspective view of the sync-pitch-varying mechanism in accordance with the present invention, showing one bearing seat in an exploded manner.

The detailed structure of said bearing seat 22 can be shown more apparently with reference to FIGS. 6, 7 and 8. FIG. 6 is a cross sectional view along line B-B in FIG. 5 showing the rotor 20 of the wind turbine. FIG. 7 is a schematic perspective view of the sync-pitch-varying mechanism 100, showing only one bearing seat while the rotor hub 21 being omitted. FIG. 8 is a schematic perspective view of the sync-pitch-varying mechanism 100 showing the bearing seat 22 in an exploded manner. FIGS. 5 and 6 clearly show the structural relationship between the bearing seat 22 and the rotor hub 21, while FIGS. 7 and 8 shows more clearly the connection between the bearing seat 22 and the sync-pitch-varying mechanism 100. Said bearing seat 22 includes a joint flange 221, a bearing 222 and a hood 223. One end of the joint flange 221 is fixedly connected with a blade root (not shown) by means of multiple fasteners. Another end of the joint flange 221 is fixedly connected with an inner ring of the bearing 222. An outer ring of the bearing 222 is fixedly connected with the periphery of the fixing opening. The inner ring of the bearing 222 is rotatable with respect to the outer ring of the bearing 222, and thereby allowing the corresponding blade to be rotatable with respective to the rotor hub 21.

With reference to FIG. 5, FIGS. 7 and 8, the sync-pitch-varying mechanism 100 of the present invention mainly comprises a driver 110, a transmission 120, a linkage 130, and a control unit. Said driver 110 preferably uses a common frequency-variable motor in combination with a planetary gear, also called as the planetary gear motor. Said transmission 120 is mainly consisted of a shaft coupling 121, a ballscrew 122, a supporting structure 123, an intermediate cylinder 124, a driven shaft 125 and a transition cylinder 126. Said linkage 130 includes a link hub 131, a guide support 132 and multiple links 133 corresponding to the multiple blades. Further, the control unit generally includes a speed sensor for measuring speed output from the planetary gear motor, a position sensor for detecting moving position of the intermediate cylinder 124, a switch for shifting spinning orientation of the ballscrew 122, and a programmable controller for controlling rotational speed and orientation of the ballscrew 122 of sync-pitch-varying mechanism 100.

In particular, the driver 110, i.e. the frequency-variable planetary gear motor has an output shaft fixedly connected with respect to a first end of the ballscrew 122 through the shaft coupling 121, therefore the ballscrew 122 is rotatable together with the output shaft of the planetary gear motor. It can be seen from FIG. 1 that the first end portion of the ballscrew 122 is supported by means of the supporting structure 123 provided at a rear end of the generator rotor 12. Preferably, said supporting structure 123 is designed with a double-layer bearing, which takes advantage of the generator rotor 12 as a supporting means to support an end portion of said ballscrew 122 of the transmission 120 in a way that it is not only simplified in the structure but also highly safeguarded in the operation. Another end of the ballscrew 122 is connected with a first end of the intermediate cylinder 124 in a screw-and-nut transmission. A rotary motion in either clockwise or anti-clockwise direction output from the ballscrew 122 is firstly transferred to the intermediate cylinder 124 to move the intermediate cylinder 124 with respect to the ballscrew 122 reciprocally through the screw-and-nut transmission between the ballscrew 122 and the intermediate cylinder 124, and then transferred to the driven shaft 125 through the intermediate cylinder 124. A first end of the driven shaft 125 is connected to a second end of the intermediate cylinder 124 through the transition cylinder 126 in a way that allows the driven shaft 125 to be only rotatable but not linearly movable in axial direction with respect to the intermediate cylinder 124, of which the detailed structure will be described in the following description with reference to FIG. 9. A second end of the driven shaft 125 is connected with front end portions of the link hub 131 and guide support 132 by means of a pin 127 extending through the link hub 131 and guide support 132, of which the detailed structure will be described in the following description with reference to FIG. 10.

Figure 9:
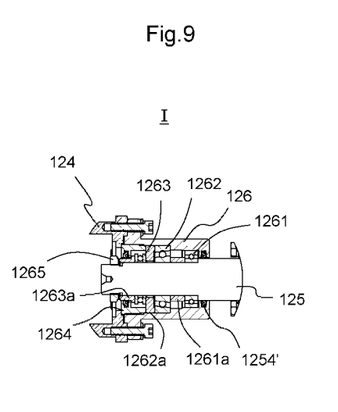
FIG. 9 is an enlarged cross sectional view of part I as indicated in FIG. 5, showing a connection between a first end of a driven shaft and a second end of an intermediate cylinder in a transmission of the sync-pitch-varying mechanism according to the present invention.

FIG. 9 is an enlarged cross sectional view of part I as shown in FIG. 5. The first end of a driven shaft 125 is connected to the second end of an intermediate cylinder 124 through the means of the transition cylinder 126. Said transition cylinder 126 includes a case having a flange fixedly mounted on the second end of the intermediate cylinder 124 by threaded bolts, a first bearing 1261 and a second bearing 1262 and a third bearing 1263 being sequentially arranged inside of this case, and a first washer 1261a and a second washers 1262a and a third washer 1263a being respectively provided aside the first bearing 1261 and the second bearing 1262 and third bearing 1263. A portion of the first end of said driven shaft 125 is designed with two stages. A first stage of the driven shaft 125 is extended through a closed end wall of the case of said transition cylinder 126 and retained by the side surface of said first bearing 1261. The first end portion of the driven shaft 125 entends throughout the first bearing 1261 and the second bearing 1262 and third bearing 1263 and a cover 1264 provided at a rear opening end of the transition cylinder 126 and extended a short length into the intermediate cylinder 124 and fixed by a screw nut 1265. A second stage of the driven shaft 125 is retained by a front side of the screw nut 1265, which is retained by the cover 1264 pressed against the screw nut 1265. Therefore, the driven shaft 125 is connected to the transition cylinder 124 in a way that is rotatable but not linearly movable with respect to the transition cylinder 124, thus the linear motion of the transition cylinder 124 is transferred to the driven shaft 125, so as to move the link hub 131 linearly in simultaneous with rotatory motion about an axis thereof.

Figure 10:
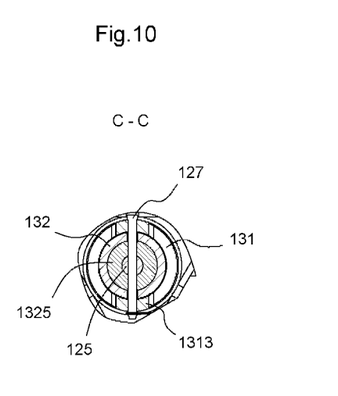
FIG. 10 is a cross sectional view along line C-C in FIG. 5 showing a connection between a second end of the driven shaft and a link hub and a guide support of the linkage of the present invention.

FIG. 10 is an enlarged cross sectional view along line C-C in FIG. 5 in order to more clearly show the connection relation between the second end of the driven shaft 125 with the link hub 131, the guide support 132 and the pin 127 of the linkage 130.

Figure 11A:
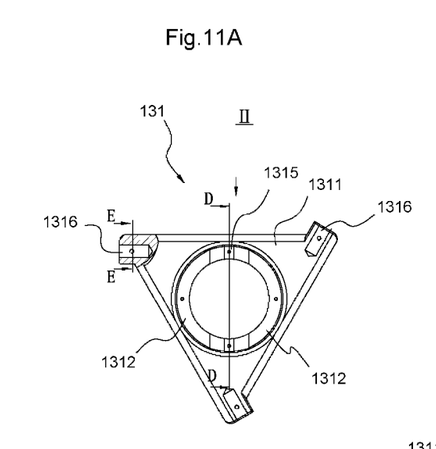
FIG. 11A is a front view showing a link hub of the linkage in accordance with the embodiment of the invention.
Figure 11B:
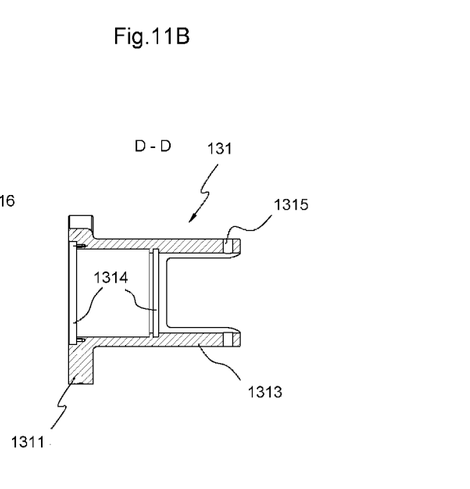
FIG. 11B is a cross sectional view along line D-D in FIG. 11A showing the link hub of the linkage in accordance with the embodiment of the invention.
Figure 11C:
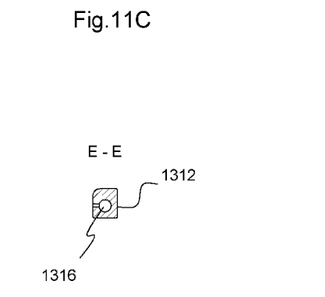
FIG. 11C is a partial side view from II direction as indicated in FIG. 11A showing a connecting lug of the link hub of the linkage in accordance with the embodiment of the invention.
Figure 11D:
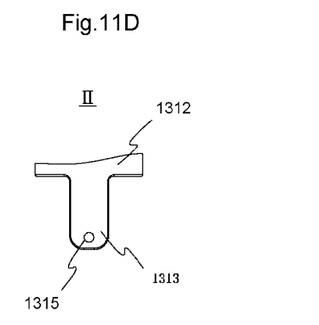
FIG. 11D is a cross sectional view along line E-E in FIG. 11A showing the link hub of the linkage in accordance with the embodiment of the invention.

The structure of the link hub 131 is better shown in FIG. 11A to FIG. 11D. FIG. 11A is a front view of the link hub 131, FIG. 11B is a cross sectional view along line D-D in FIG. 11 A, FIG. 11C is a partial side view from II direction as indicated in FIG. 11A showing a front end portion of the link hub 131, and FIG. 11D is a cross sectional view along line E-E in FIG. 11A showing a bolt hole defined in a connecting end of the link hub 131. Said link hub 131 shown in the drawings as an embodiment of the invention is integrally formed with a disc-shaped base 1311, a sleeve 1312 and a pair of connecting lugs 1313 protruded from the sleeve 1312. There are multiple bolt holes 1316 defined in side surface of the disc-shaped base 1311 corresponding to the multiple the blades. A central axis of each one bolt hole 1316 is substantively parallel to a rotatory central axis of a corresponding bearing 222. Said sleeve 1312 has two annular grooves 1314 defined therein at two opposite ends thereof for receiving oil seals in said annular grooves 1314. Said two connecting lugs 1313 have two pin holes 1315 respectively defined therein facing towards each other.

Figure 12A:
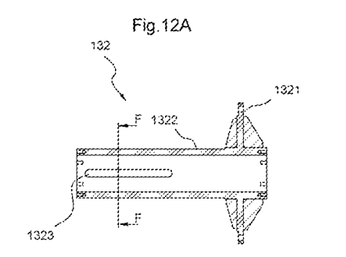
FIG. 12A is a cross sectional view showing an embodiment of a guide support of the linkage in accordance with the present invention.
Figure 12B:
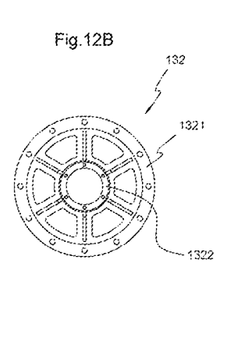
FIG. 12B is a side view showing the embodiment of the guide support of the linkage in accordance with the present invention.
Figure 12C:
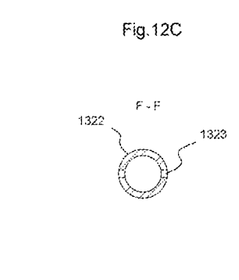
FIG. 12C is a cross sectional view along line F-F in FIG. 12A showing the embodiment of the guide support of the linkage in accordance with the present invention.
Figure 12D:
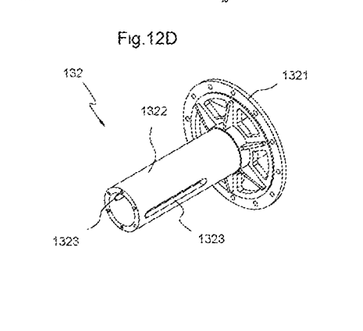
FIG. 12D is a perspective view showing the embodiment of the guide support of the linkage in accordance with the present invention.

The structure of the guide support 132 is better seen from FIG. 12A to FIG. 12D. FIG. 12A is a cross sectional view of the guide support 132. FIG. 12B is a side view of the guide support of the guide support 132. FIG. 12C is a cross sectional view along line F-F in FIG. 12A of the guide support 132. FIG. 12D is a perspective view of the guide support 132. Said guide support 132 is integrally formed with a fixing base 1321 fixedly mounted at a rear end of the rotor hub 21, and a guide sleeve 1322 extending horizontally from a central of the fixing base 1321 into a middle portion of the rotor hub 21 towards a front end of the rotor hub 21. Said guide sleeve 1322 is defined with a pair of elongated guide slots 1323 near a free end thereof corresponding to the two pin holes 1315 on the sleeve 1312 of the link hub 131.

The guide sleeve 1322 has an end cover 1324 provided at a rear end thereof facing towards the transmission cylinder 124, and a lubricating bearing being provided between said end cover 1324 and the driven shaft 125.

Now returning back to FIG. 10 with reference to FIGS. 7 and 8, the pin 127 is inserted through the pin holes 1315 (as seen in FIG. 11) of the connecting lugs 1313 of the link hub 131, the guide slots 1323 (as seen in FIG. 12) of the guide sleeve 1322 of the guide support 132, a slide 1325, and a pin hole defined in the second end of the driven shaft 125 for connection. Thus, the driven shaft 125 moves linearly along an axial direction together with the pin 127 moving along the elongated guide slots 1323 of the guide sleeve 1322, and therefore, said link hub 131 surrounding said guide sleeve 1322 is carried by said driven shaft 125 to move along the elongated guide slots 1323 of said guide sleeve 1322, in such a way, said the elongated guide slots 1323 functions as an orientation guide to the pin 127 and the link hub 131. Therefore, through the above described structure, said driven shaft 125 is rotatably function together with the blades and the rotor hub 21 in accompanying with said link hub 131, and in the meanwhile said link hub 131 carried by said driven shaft 125 is also linearly movable along said guide sleeve 1322 of the guide support 132 under the driving force output from the frequency-variable planetary gear motor 110.

Figure 13A:
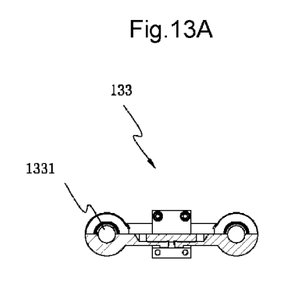
FIG. 13A is a schematic side view with a partial cross section showing an embodiment of a link of the linkage in accordance with the present invention.
Figure 13B:
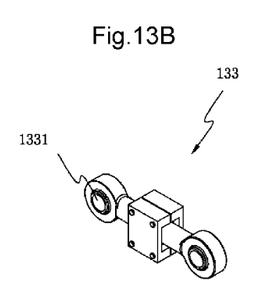
FIG. 13B is a perspective view showing the embodiment of the link of the linkage in accordance with the present invention.

The above described linkage 130 according to the invention is operatively connected to the inner rings 2222 of the multiple bearings 222 via the corresponding multiple links 133, the structure of which are illustrated in a front side view as shown in FIG. 13A and a perspective view as shown in FIG. 13B. Specially, as referred to FIG. 5 to FIG. 8, each one of said link 133 has two opposite ends which are respectively formed with two link holes 1316. A first end of said link 133 is pivotally connected with the disc-shaped base 1311 of the link hub 131 via a first connecting bolt, and a second end of said link 133 is pivotally connected with a connecting block 134 which is fixed to the inner ring 2222 by multiple screws as can be seen in FIG. 8.

Now referring to FIGS. 7 and 8, the working principle of the single driver sync-pitch-varying mechanism of multi-blade rotor of the present invention will be introduced. When the motor of the driver 110 starts running, a rotatory motion output through the gear from the frequency-variable planetary gear motor is transmitted to a linear motion of the driven shaft 125 through the transmission 124, thus the link hub 131 carried by the driven shaft 125 moves linearly in axial direction along the guide sleeve 1322. Said link hub 131 is movable in axial direction within a predetermined range which is configured in any applicable instructions or programs via the programmable controller and controlled through the means of the position sensor and the switch, and thus the inner rings 2222 of the bearings 222 is rotatably with respect to the outer rings 2221 of the bearings 222 within a rotatable angle range which is determined as a function of the predetermined movable length range of said link hub 131. Through the above described mechanism, when the rotor is spinning, the driven shaft 125 driven by the pin 127 is also spinning along with the rotor, when the driver, i.e. the frequency-variable planetary gear motor 110 starts running, the driven shaft 125 driven by the motor 110 moves linearly so as to drive said link hub 131 to move along the guide sleeve 1322. The speed sensor can be provided aside the gear of the frequency-variable planetary gear motor, as it can be seen from drawings, so that the speed output from this planetary gear motor is measurable by the speed sensor, therefore, a pitch or angle of the blade can be calculated by the controller, and thus the speed output from the frequency-variable planetary gear motor is controllable so as to change the speed of varying of the pitch. According to the present invention, the position sensor are intended to detect the displacement of the link hub 131, so that the controlling process can be simplified by measuring a displacement of the link hub 131 and determining a target angle range to be changed through an application program embedded in the programmable controller, therefore a high precise control and reliable operation of the sync-pitch-varying mechanism of the present invention are realized.

In addition, the present invention also advantageously provides a mechanism for synchronously varying pitch of a rotor with a self-feathering function. Since the driver of the sync-pitch-varying mechanism of the invention is not only connected to the grid power but also connected to a power supply output of a generator, for instance, a wind generator, the generator provides an on-line type power supply as a backup instead of conventional battery sets to the driver of the sync-pitch-varying mechanism to perform feathering in the case when the grid power is failed. Further, the mechanism for synchronously varying pitch of a rotor of the invention provided with the frequency-variable brake motor is also capable of retaining its pitch angle in operation after an adjustment of the pitch.

In summary, the mechanism for varying pitch of a rotor in accordance with the present invention transforms a rotatory motion output from the single driver to a linear motion of the transmission, through which the linear motion is in turn transmitted to the linkage to move the multiple links synchronously with the link hub of the linkage, and then through the connection between the multiple links and the corresponding multiple bearings, a driving force output from a single driver is transmitted to the multiple bearings to move the inner rings of the bearings with respect to the outer rings of the bearings for pitch varying. Advantageously, by taking advantage of one single driver, the transmission and linkage of the inventive mechanism, the varying of pitch for the rotor is easily controlled under the control unit with high precision, consistency and reliability.

The mechanism for varying pitch of a rotor of according to the embodiment of the invention is also advantage in that the transmission 120 is accommodated in the nacelle 11, therefore, it is possible to fix those electronic components and circuits for normal detection on static parts in the nacelle 11, and in that only light weight small size mechanical parts of the linkage 130 are fitted in limited internal space of the rotor hub 21, and also in that the ballscrew of the transmission 120 is supported by a double-layer bearing, therefore, the operation reliability and stability of the transmission 120 is secured, and the wiring of the circuit of the control unit is optimized in its safety and stability, and also convenient to be fixed and maintained. Thus the life span of the whole system using this mechanism is prolonged.

Although the foregoing examples which have already been illustrated as preferred embodiments of present invention, those people who are skilled in the art may better understand that any possible changes, modifications and amendments for carrying out the same purpose of the present invention are readily perceivable under the teaching of this invention. And those skilled in the art should also realize that any equivalents without apart from the spirit and concept of this invention still fall into the protection scope of the invention as defined in the appended claims.

We claim:

1. A wind turbine including a generator arranged in a nacelle and a mechanism for synchronously varying pitch of a multi-blade rotor having a rotor hub with multiple blades,
   wherein said multiple blades are equal-spaced mounted around said rotor hub through means of corresponding bearing seats,
   each one of which includes a bearing having an outer ring and an inner ring being rotatably movable with respect to said outer ring,
   wherein said mechanism includes a driver, a transmission, a linkage, and a control unit;
   wherein said transmission includes a shaft coupling, a ballscrew, an intermediate cylinder, a driven shaft and a transition cylinder; said linkage includes a link hub, a guide support and multiple links; said control unit includes a speed sensor, a position sensor, a switch and a programmable controller;
   a rotatory driving force output by said driver through the shaft coupling is transmitted to the driven shaft through a screw-and-nut transmission between the ballscrew and the intermediate cylinder of said transmission so as to drive the driven shaft to move in a linear motion which is then transferred from the driven shaft to the link hub of the linkage through means of the transition cylinder, said driven shaft is connected to the intermediate cylinder through the transition cylinder in a way that allows the driven shaft to be only rotatable but not linearly movable in an axial direction with respect to the intermediate cylinder;

said controller is configured to enable the driven shaft to move reciprocally within a predefined range of length in order to move the link hub back and forth along the guide support in an axial direction thereof, and therefore said multiple inner rings are rotatably movable in same angle speed synchronously with respect to said corresponding multiple outer rings of said multiple bearings under the driving of the link hub through the corresponding multiple links.

2. The wind turbine as claimed in claim 1, wherein said transmission further includes a supporting structure with a double-layer bearing for supporting the ballscrew.

3. The wind turbine as claimed in claim 1, wherein the link hub is integrally formed with a disc-shaped base and a sleeve extending therefrom, wherein a pair of connecting lugs are protruded from a frond end of said sleeve and respectively defined with two pin holes therein opposite to each other.

4. The wind turbine as claimed in claim 3, wherein two annular grooves are respectively defined in an inner surface of said sleeve of said link hub near two opposite ends thereof for receiving oil seal therein.

5. The wind turbine as claimed in claim 3, wherein said base of the link hub has multiple screw holes defined there around in equal space corresponding to the multiple blades, each said screw hole has a central axis extending substantively parallel to a central axis of a corresponding bearing.

6. The wind turbine as claimed in claim 1, wherein said guide support is integrally formed with a base and a guide sleeve, wherein said guide sleeve extending from the base into the rotor hub is defined with a pair of guide slots opposite to each other.

7. The wind turbine as claimed in claim 1, wherein the first end of said driven shaft is connected with said intermediate cylinder through said transition cylinder, which has a first, second and third bearings arranged therein in sequence, and a first, second and third washers provided aside said first, second and third bearings respectively, a portion of the first end of said driven shaft is configured in two stages, a first stage extending through a closed end wall of said transition cylinder and being retained by a side of said first bearing, a second stage extending throughout the first, second, third bearings and a cover into the intermediate cylinder and then being fastened by a screw nut so as to be retained by a side of said screw nut, which is retained against the cover.

* * * * *